(12) United States Patent
Reznik et al.

(10) Patent No.: US 12,141,039 B2
(45) Date of Patent: Nov. 12, 2024

(54) ENHANCED FENCING SCHEME FOR CLUSTER SYSTEMS WITHOUT INHERENT HARDWARE FENCING

(71) Applicant: EMC IP Holding Company LLC, Hopkinton, MA (US)

(72) Inventors: Inna Reznik, Tel Aviv (IL); Ahia Lieber, Tel Aviv (IL); Peter J. McCann, Mason, NH (US); Joe Caisse, Burlington, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 757 days.

(21) Appl. No.: 17/208,213

(22) Filed: Mar. 22, 2021

(65) Prior Publication Data

US 2022/0300384 A1   Sep. 22, 2022

(51) Int. Cl.
*G06F 11/14* (2006.01)
*G06F 9/455* (2018.01)
*G06F 11/07* (2006.01)

(52) U.S. Cl.
CPC ...... *G06F 11/1484* (2013.01); *G06F 9/45558* (2013.01); *G06F 11/079* (2013.01); *G06F 11/1438* (2013.01); *G06F 2009/45575* (2013.01); *G06F 2009/45579* (2013.01); *G06F 2009/45591* (2013.01); *G06F 2009/45595* (2013.01)

(58) Field of Classification Search
None
See application file for complete search history.

(56) References Cited

U.S. PATENT DOCUMENTS

| 7,480,816 B1 * | 1/2009 | Mortazavi | G06F 11/1482 714/10 |
| 8,707,082 B1 * | 4/2014 | Chen | G06F 11/0709 707/790 |
| 9,514,014 B2 | 12/2016 | Webman et al. | |
| 10,412,066 B1 * | 9/2019 | Vemuri | G06F 21/79 |

(Continued)

FOREIGN PATENT DOCUMENTS

| CA | 2719673 A1 * | 1/2011 | G06F 11/006 |
| WO | WO-2017052548 A1 * | 3/2017 | G06F 11/07 |

*Primary Examiner* — Lewis A Bullock, Jr.
*Assistant Examiner* — Melissa A Headly
(74) *Attorney, Agent, or Firm* — BainwoodHuang

(57) ABSTRACT

Techniques for providing a fencing scheme for cluster systems without inherent hardware fencing. Storage nodes in an HA cluster communicate with one another over communication paths implemented through a variety of mechanisms, including drives and network connections. Each storage node in the HA cluster executes a fencing enforcer component operable to enforce actions or processes for initiating fencing of itself and/or initiating self-fencing of another storage node in the HA cluster determined to be malfunctioning. By providing for richer communications between storage nodes in an HA cluster and a richer set of actions or processes for fencing a malfunctioning storage node including self-fencing, the malfunctioning storage node can be made to exit the HA cluster in a more controlled fashion. In addition, a remaining storage node in the HA cluster can more safely take on the role of primary storage node with reduced risk of data corruption on shared resources.

18 Claims, 7 Drawing Sheets

(56) References Cited

U.S. PATENT DOCUMENTS

| | | |
|---|---|---|
| 10,936,224 B1 | 3/2021 | Koning et al. |
| 11,023,602 B2 | 6/2021 | Chaiken et al. |
| 11,093,171 B2 | 8/2021 | Krivenok et al. |
| 11,106,556 B2 | 8/2021 | Koning et al. |
| 2019/0149399 A1* | 5/2019 | Reed ................... H04L 41/0897 709/223 |
| 2020/0250126 A1* | 8/2020 | Guo ........................ G06F 3/067 |
| 2022/0283712 A1* | 9/2022 | Goren ................. G06F 11/2094 |

* cited by examiner

ENHANCED FENCING SCHEME FOR CLUSTER SYSTEMS WITHOUT INHERENT HARDWARE FENCING

BACKGROUND

Storage controllers (also referred to herein as "storage nodes" or "nodes") may be deployed in an active-passive system configuration, in which a primary node takes on the role of an active node and at least one secondary node takes on the role of a standby node. In the active-passive system configuration, the active node may process storage input/output (IO) requests from storage client computers (also referred to herein as "storage clients") and write pending changes to metadata and/or data of storage objects (e.g., file systems, volumes, logical units (LUs)) to cache memory, while the standby node may not be currently interacting with the storage clients. Storage nodes may also be deployed in an active-active system configuration, in which two or more active nodes (e.g., primary node, secondary node) collaborate to process storage IO requests from storage clients and write pending changes to metadata and/or data of storage objects to cache memory shared among the active nodes.

SUMMARY

Storage nodes in a highly available (HA) cluster can be determined or suspected to be malfunctioning or otherwise failing. For example, such malfunctioning of a storage node can be determined by its failure to respond to a ping, query, or liveness check performed by another storage node in the HA cluster. Such malfunctioning can also be determined by the storage node itself in response to a failure of an application or service executing on the storage node. In an active-passive system configuration, the malfunctioning storage node can be switched to a standby mode of operation in a failover process while an attempt is made to recover from the malfunction. Once fully recovered, the storage node can be rebooted.

Recovery from a malfunction or failure of a storage node in an active-active system configuration can be more problematic, however, due to an increased risk of data corruption on shared memory and/or other shared resources. To address this problem, storage nodes in active-active system configurations can include inherent hardware (HW) fencing mechanisms, which can employ specialized hardware configured to cut off a malfunctioning storage node's access to shared resources within an HA cluster, as well as its ability to communicate with other storage nodes within the HA cluster or with other networked computers or computerized devices. However, some active-active system configurations do not support inherent HW fencing due, at least in part, to its increased cost and/or complexity.

Techniques are disclosed herein for providing an enhanced fencing scheme for cluster systems without inherent hardware (HW) fencing. The disclosed techniques can provide for richer communications between storage nodes in a highly available (HA) cluster, as well as a richer set of actions or steps for fencing a malfunctioning or failing storage node in the HA cluster, each without requiring additional specialized hardware. In the disclosed techniques, the storage nodes in the HA cluster can communicate with one another over multiple communication paths implemented through a variety of means or mechanisms, including, but not limited to, hard disk drives (HDDs), solid-state drives (SSDs), and/or other storage devices shared among the storage nodes, private and/or independent network or channel connections between the storage nodes, and so on. Further, each storage node in the HA cluster can be configured to execute a fencing enforcer component (also referred to herein as the "fencing enforcer") to enforce actions or steps for initiating fencing of itself (also referred to herein as "self-fencing"), as warranted by its own behavior within the HA cluster, and/or initiating self-fencing of another storage node in the HA cluster determined or suspected to be malfunctioning based on a response (or a lack of response) to a command, message, ping, query, or liveness check, a failure of an application or service executing on the storage node, and so on.

By engaging in communications within an HA cluster through a variety of means or mechanisms including drives and network connections, determining that a storage node in the HA cluster is malfunctioning based on a response (or a lack of response) to the communications, and enforcing one or more actions or steps to initiate self-fencing of the storage node determined to be malfunctioning, the malfunctioning storage node can be made to exit the HA cluster in a more controlled fashion, allowing it time to collect and store diagnostic data (e.g., to a drive) for subsequent analysis before finally exiting the HA cluster. In addition, a remaining storage node in the HA cluster can more safely take on (or continue in) the role of a primary node with reduced risk of data corruption on shared memory and/or other shared resources.

In certain embodiments, a method of providing an enhanced fencing scheme for cluster systems without inherent hardware fencing includes, at a first storage node, engaging in communications with a second storage node in a highly available (HA) cluster through a plurality of communication mechanisms including a plurality of storage drives and multiple network or channel connections, determining, by the first storage node, that the second storage node is malfunctioning based at least on a response or a lack of response to the communications, and enforcing, by the first storage node, one or more actions or processes to initiate self-fencing of the second storage node determined to be malfunctioning.

In certain arrangements, the method further includes engaging in communications through a message store including a plurality of predefined areas of the plurality of storage drives, respectively, in which each of the plurality of predefined areas is configured as a mailbox.

In certain arrangements, the method further includes engaging in communications over the multiple network or channel connections configured as private or independent network or channel connections.

In certain arrangements, the method further includes stopping accessing critical resources of the second storage node, terminating processes of the second storage node accessing shared resources in the HA cluster, saving log and diagnostic information of the second storage node to a drive for subsequent analysis, and initiating an automatic reboot of the second storage node.

In certain arrangements, the method further includes determining, by the first storage node, a power status of the second storage node, and having determined that the power status of the second storage node is "powered-off," terminating enforcing the one or more actions or processes to initiate self-fencing of the second storage node.

In certain arrangements, the method further includes receiving, at the first storage node from the second storage node, a notification informing the first storage node of a kernel panic at the second storage node, and having received the notification informing the first storage node of the kernel panic at the second storage node, terminating enforcing the one or more actions or processes to initiate self-fencing of the second storage node.

In certain arrangements, the method further includes designating the first storage node as a primary node of the HA cluster, and designating the second storage node as a secondary node of the HA cluster.

In certain arrangements, the method further includes sending, by the primary node, a self-fence command to the secondary node, and waiting a specified time period, by the primary node, to receive an acknowledgment from the secondary node that the self-fencing of the secondary node has been initiated.

In certain arrangements, the method further includes, having failed to receive the acknowledgment within the specified time period, initiating, by the primary node, a reboot of the second storage node.

In certain arrangements, the method further includes, having received the acknowledgment within the specified time period, receiving, at the primary node, a self-fence command from the secondary node, and subsequently ignoring, by the primary node, the self-fence command from the secondary node.

In certain embodiments, a cluster system includes a first storage node and a second storage node arranged in an active-active storage system configuration, and a plurality of storage drives communicably coupled to the first storage node and the second storage node. The first storage node includes a memory and processing circuitry configured to execute program instructions out of the memory to engage in communications with the second storage node through a plurality of communication mechanisms including the plurality of storage drives and multiple network or channel connections, to determine that the second storage node is malfunctioning based at least on a response or a lack of response to the communications, and to enforce one or more actions or processes to initiate self-fencing of the second storage node determined to be malfunctioning.

In certain arrangements, the plurality of storage drives include a plurality of predefined areas, respectively, the plurality of predefined areas are configured as a plurality of mailboxes, respectively, and the plurality of communication mechanisms include the plurality of mailboxes.

In certain arrangements, the processing circuitry is further configured to execute the program instructions out of the memory to engage in communications over the multiple network or channel connections configured as private or independent network or channel connections.

In certain arrangements, the processing circuitry is further configured to execute the program instructions out of the memory to determine a power status of the second storage node, and having determined that the power status of the second storage node is "powered-off," to terminate enforcing the one or more actions or processes to initiate self-fencing of the second storage node.

In certain arrangements, the processing circuitry is further configured to execute the program instructions out of the memory to receive, from the second storage node, a notification informing the first storage node of a kernel panic at the second storage node, and having received the notification informing the first storage node of the kernel panic at the second storage node, to terminate enforcing the one or more actions or processes to initiate self-fencing of the second storage node.

In certain arrangements, the processing circuitry is further configured to execute the program instructions out of the memory to send a self-fence command to the second storage node, and to wait a specified time period to receive an acknowledgment from the second storage node that the self-fencing of the second storage node has been initiated.

In certain arrangements, the processing circuitry is further configured to execute the program instructions out of the memory, having failed to receive the acknowledgment within the specified time period, to initiate a reboot of the second storage node.

In certain arrangements, the processing circuitry is further configured to execute the program instructions out of the memory, having received the acknowledgment within the specified time period, to receive a self-fence command from the secondary node, and to subsequently ignore the self-fence command from the secondary node.

In certain embodiments, a cluster system includes a first storage node and a second storage node arranged in an active-active storage system configuration. The first storage node is configured as a first virtual machine (VM) executing on at least one hypervisor host, and the second storage node is configured as a second VM executing on the at least one hypervisor host. The cluster system further includes a plurality of storage drives communicably coupled to the first VM and the second VM. The first VM is configured to engage in communications with the second VM through a plurality of communication mechanisms including the plurality of storage drives and multiple network or channel connections, to determine that the second VM is malfunctioning based at least on a response or a lack of response to the communications, and to enforce one or more actions or processes to initiate self-fencing of the second VM determined to be malfunctioning.

In certain arrangements, the first VM is further configured to obtain, from the at least one hypervisor host, an identifier (ID) of the second VM determined to be malfunctioning, and to force a kernel panic at the second VM having the obtained ID by issuing a non-maskable interrupt (NMI) on the at least one hypervisor host.

In certain arrangements, the first VM is further configured to fail to receive a notification of the kernel panic, and having failed to receive the notification of the kernel panic, to send a request to the at least one hypervisor host to terminate and restart the second VM having the obtained ID.

Other features, functions, and aspects of the present disclosure will be evident from the Detailed Description that follows.

BRIEF DESCRIPTION OF THE DRAWINGS

The foregoing and other objects, features, and advantages will be apparent from the following description of particular embodiments of the present disclosure, as illustrated in the accompanying drawings, in which like reference characters refer to the same parts throughout the different views.

DETAILED DESCRIPTION

Techniques are disclosed herein for providing an enhanced fencing scheme for cluster systems without inherent hardware (HW) fencing. In the disclosed techniques, storage nodes in a highly available (HA) cluster can communicate with one another over multiple communication paths implemented through a variety of means or mechanisms, including drives and network connections. Each storage node in the HA cluster can be configured to execute a fencing enforcer component (or "fencing enforcer") to enforce actions or steps for initiating fencing of itself (or "self-fencing") and/or initiating self-fencing of another storage node in the HA cluster determined or suspected to be malfunctioning. By engaging in communications within an HA cluster through a variety of means or mechanisms, determining that a storage node in the HA cluster is malfunctioning based on a response (or a lack of response) to the communications, and enforcing one or more actions or steps to initiate self-fencing of the storage node determined to be malfunctioning, the malfunctioning storage node can be made to exit the HA cluster in a more controlled fashion, while a remaining storage node in the HA cluster can more safely take on (or continue in) the role of a primary node with reduced risk of data corruption on shared memory and/or other shared resources.

Figure 1B:
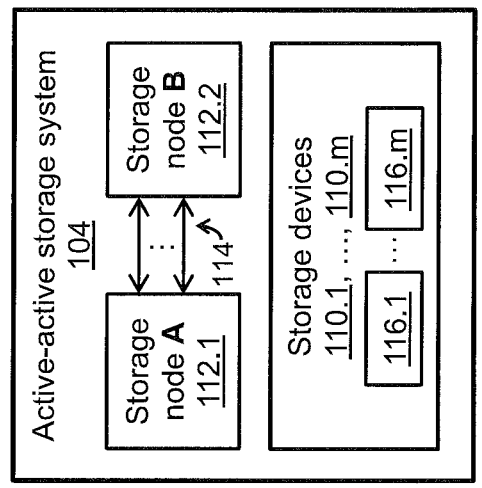
FIG. 1b is a block diagram of an active-active storage system in the storage environment of FIG. 1a, in which the active-active storage system includes a plurality of storage controllers (or "storage nodes," "nodes") and a plurality of shared storage devices.
Figure 1A:
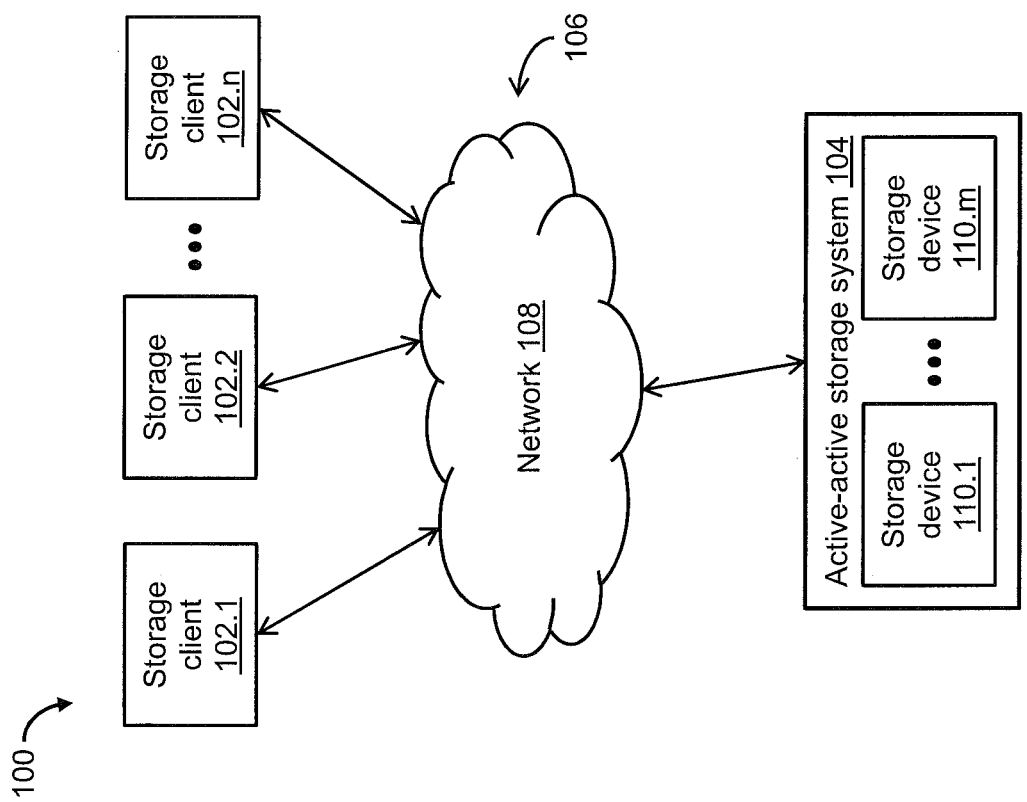
FIG. 1a is a block diagram of an exemplary storage environment, in which techniques can be practiced for providing an enhanced fencing scheme for cluster systems without inherent hardware (HW) fencing.

FIG. 1a depicts an illustrative embodiment of an exemplary storage environment 100, in which techniques can be practiced for providing an enhanced fencing scheme for cluster systems without inherent hardware (HW) fencing. As shown in FIG. 1a, the storage environment 100 can include a plurality of storage client computers (or "storage clients") 102.1, 102.2, . . . , 102.n, an active-active storage system 104, and a communications medium 106 that includes at least one network 108. For example, each of the plurality of storage clients 102.1, . . . , 102.n can be configured as a file server computer, an email server computer, an enterprise server computer, a web server computer, or any other suitable client/server computer or computerized device. The plurality of storage clients 102.1, . . . , 102.n can be configured to provide, over the network 108, storage input/output (IO) requests (e.g., network file system (NFS) commands, small computer system interface (SCSI) commands) to the active-active storage system 104. Such storage IO requests (e.g., write IO requests, read IO requests) can direct a storage controller (or "storage node") to write or read data files, data blocks, data pages, or any other suitable data elements to/from file systems, volumes (VOLs), logical units (LUs), or any other suitable storage objects maintained in association with the active-active storage system 104. As further shown in FIG. 1a, the active-active storage system 104 can include a plurality of storage devices 110.1, . . . , 110.m, which can be embodied as hard disk drives (HDDs), solid-state drives (SSDs), flash drives, or any other suitable storage devices for storing storage object metadata and/or data.

The communications medium 106 can be configured to interconnect the plurality of storage clients 102.1, . . . , 102.n and the active-active storage system 104 to enable them to communicate and exchange data and/or control signaling. As shown in FIG. 1a, the communications medium 106 can be illustrated as a "cloud" to represent different network topologies, such as a storage area network (SAN) topology, network attached storage (NAS) topology, local area network (LAN) topology, metropolitan area network (MAN) topology, wide area network (WAN) topology, wireless network topology, wired network topology, hybrid network topology, and so on. As such, the communications medium 106 can include copper-based data communications devices and cabling, fiber optic-based communications devices and cabling, wireless communications devices, and so on, or any suitable combination thereof.

FIG. 1b depicts another view of the active-active storage system 104 of FIG. 1a. As employed herein, the term "active-active storage system" refers to a highly available (HA) cluster, in which multiple storage nodes have shared or exclusive read-write IO access to the same storage objects (e.g., file systems, volumes (VOLs), logical units (LUs)). As shown in FIG. 1b, the active-active storage system 104 can include at least two storage controllers (or "storage nodes"), namely, a storage node A 112.1 and a storage node B 112.2. Each of the storage node A 112.1 and the storage node B 112.2 can receive storage IO requests from the respective storage clients 102.1, . . . , 102.n over the network 108. In response to the storage IO requests, the storage nodes A 112.1, B 112.2 can perform storage IO operations (e.g., read-write IO operations) to read/write data files, data blocks, data pages, or any other suitable data elements from/to storage objects on the storage devices 110.1, . . . , 110.m. In some embodiments, the storage nodes A 112.1, B 112.2 can maintain metadata and/or data pertaining to the read-write IO operations in distributed shared memory and employ mechanisms to assure that the metadata and/or data remain consistent and coherent across the storage nodes A 112.1, B 112.2. If, for example, the storage node A 112.1 in the role of a primary node exits the HA cluster, e.g., is taken offline or at any other suitable time, then the remaining storage node B 112.2 may take on the role and duties of the primary node with regard to the handling of storage IO requests, providing high availability within the active-active storage system 104.

As further shown in FIG. 1b, the storage nodes A 112.1, B 112.2 can communicate with one another over two or more private and/or independent network or channel connections 114. In some embodiments, one or more of the network or channel connections 114 can be configured to support the Intelligent Platform Management Interface (IPMI) protocol, the Inter-Integrated Circuit (I²C) protocol, and/or any other suitable protocol. In addition, the storage nodes A 112.1, B 112.2 can communicate with one another through a message store. In some embodiments, the message store can be configured to include predefined areas 116.1, ..., 116.m of the storage devices 110.1, ..., 110.m, respectively, each of which can function as a mailbox. Further, each storage node A 112.1, B 112.2 can have mailbox addresses corresponding to the predefined areas 116.1, ..., 116.m across the respective storage devices 110.1, ..., 110.m where messages can be written and subsequently read by the other storage node A 112.1 or B 112.2. In some embodiments, the message store can be implemented in memory shared among the storage nodes A 112.1, B 112.2. In this way, multiple communication paths between the storage nodes A 112.1, B 112.2 of the active-active storage system 104 can be implemented through a variety of means or mechanisms, including, but not limited to, drives and network connections.

Figure 2:
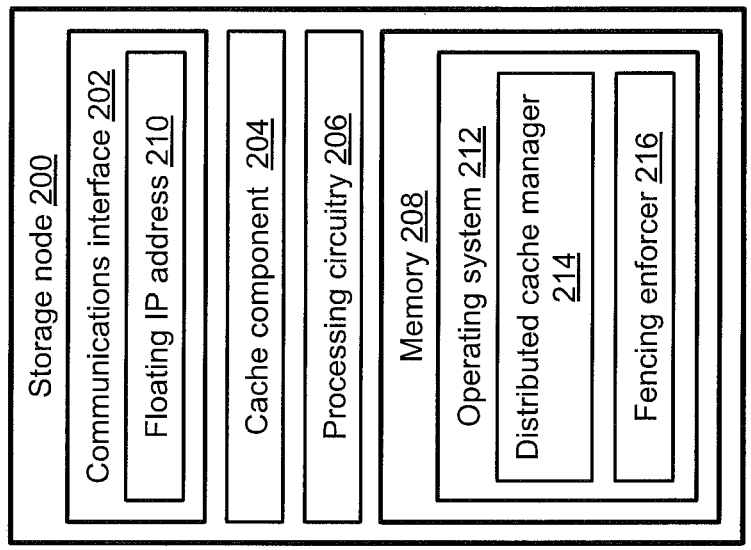
FIG. 2 is a block diagram of an exemplary storage node from among the plurality of storage nodes included in the active-active storage system of FIG. 1b, in which the storage node includes a floating Internet protocol (IP) address, a distributed shared cache component, and a fencing enforcer component (or "fencing enforcer")

FIG. 2 depicts an exemplary storage node 200 from among the storage nodes A 112.1, B 112.2 of the active-active storage system 104 of FIG. 1b. As shown in FIG. 2, the storage node 200 can include a communications interface 202, a cache component 204, processing circuitry 206, and a memory 208. The communications interface 202 can include an Ethernet interface, an InfiniBand interface, a fiber channel interface, or any other suitable communications interface. The communications interface 202 can further include network interface adapters, SCSI target adapters, or any other suitable adapters for converting electronic, optical, or wireless signals received over the network(s) 108 to a form suitable for use by the processing circuitry 206. In some embodiments, the communications interface 202 can be identified on the network 108 by a floating Internet protocol (IP) address 210, which can be established on an Ethernet port of the storage node A 112.1 or B 112.2 designated as the primary node in the HA cluster. In some embodiments, the cache component 204 (e.g., RAM cache) can be configured as part of a distributed shared memory across the storage nodes A 112.1, B 112.2. Cache memory is considered herein to be faster and more accessible by processing circuitry than non-cache memory. The memory 208 can include volatile memory such as random-access memory (RAM) or any other suitable volatile memory, as well as persistent memory such as NVRAM, read-only memory (ROM), HDDs, SSDs, or any other suitable persistent memory. The memory 208 can be configured to store a variety of software constructs realized in the form of specialized code and data (e.g., program instructions) that can be executed by the processing circuitry 206 to carry out the techniques and/or methods disclosed herein. The memory 208 can further include an operating system (OS) 212 such as the Linux OS, Unix OS, Windows OS, or any other suitable operating system, as well as a distributed cache manager 214 and a fencing enforcer 216, each of which can be executed by the processing circuitry 206. The processing circuitry 206 can include physical processors, controllers, IO modules, and/or any other suitable computer hardware or combination thereof.

It is noted that, like the storage node 200 of FIG. 2, each of the storage node A 112.1 and the storage node B 112.2 of FIG. 1b can be configured to include at least a communications interface, a cache component, processing circuitry, a memory, an OS, an instance of a distributed cache manager, and an instance of a fencing enforcer. In the disclosed techniques, the cache components of the storage nodes A 112.1, 112.2 can be configured to implement a distributed shared memory across the storage nodes A 112.1, B 112.2, and instances of the distributed cache manager can be configured to assure consistency and coherency of metadata and/or data maintained in the distributed shared memory. Further, one or both of the storage nodes A 112.1, B 112.2 can execute the fencing enforcer 216 to enforce actions or steps for initiating fencing of itself (or "self-fencing"), as warranted by its own behavior within the HA cluster, and/or initiating self-fencing of the other storage node A 112.1 or B 112.2 in the HA cluster determined or suspected to be malfunctioning. As employed herein, the term "fencing" refers to actions or steps for restraining or otherwise blocking a malfunctioning storage node from accessing shared or critical resources, communicating with other storage nodes within the HA cluster, and/or responding to application and/or network requests. As such, a fenced storage node is incapable of executing any useful processes within an HA cluster until it has fully recovered from its malfunction or failure and been brought back as an active node within the HA cluster. In addition, in the case where the fenced storage node was initially designated as the primary node in the HA cluster, the other storage node A 112.1 or B 112.2 can be promoted from the role of the secondary node to the role of the primary node. Further, the floating IP address 210 can be established on an Ethernet port of the newly promoted primary node.

In the context of the processing circuitry 206 of the storage node 200 being implemented with physical processors executing specialized code and data, a computer program product can be configured to deliver all or a portion of the specialized code and data to the respective processor(s). Such a computer program product can include non-transient computer-readable storage media, such as a magnetic disk, a magnetic tape, a compact disk (CD), a digital versatile disk (DVD), an optical disk, a flash drive, a solid-state drive (SSD), a secure digital (SD) chip or device, an application specific integrated circuit (ASIC), a field programmable gate array (FPGA), and so on. Further, the non-transient computer-readable storage media can be encoded with sets of program instructions for performing, when executed by the respective processor(s), the various techniques and/or methods disclosed herein.

The disclosed techniques can provide for richer communications between the storage node A 112.1 and the storage node B 112.2 within the HA cluster of the active-active storage system 104. For example, the storage nodes A 112.1, B 112.2 can communicate with one another over the private and/or independent network or channel connections 114, as well as through the message store implemented by the plurality of storage devices 110.1, ..., 110.m shared among the storage nodes A 112.1, B 112.2. The disclosed techniques can further provide a richer set of actions or steps for fencing a malfunctioning or failing storage node within the HA cluster, including self-fencing. By engaging in communications within the HA cluster through a variety of means or mechanisms including drives and network connections, determining that one of the storage nodes A 112.1, B 112.2 is malfunctioning based on a response (or a lack of response) to the communications, and enforcing one or more actions or steps to initiate self-fencing of the storage node A 112.1 or B 112.2 determined to be malfunctioning, the malfunctioning storage node A 112.1 or B 112.2 can be made to exit the HA cluster in a more controlled fashion, allowing it time to collect and store diagnostic data (e.g., to a drive) for subsequent analysis before finally exiting the HA cluster. In addition, the remaining storage node B 112.2 or A 112.1 in the HA cluster can more safely take on (or continue in) the role of a primary node with reduced risk of data corruption on distributed shared memory and/or other shared resources.

During operation, any suitable process can be used to determine which storage node A 112.1 or B 112.2 of the active-active storage system 104 is to be designated as the primary node of the HA cluster. In some embodiments, a voting process can be employed, in which one or more messages can be written across the predefined areas 116.1, ..., 116.m of the storage devices 110.1, ..., 110.m, respectively, and a quorum of the storage devices 110.1, ..., 110.m can be required to validly receive the message(s). Based on its performance in receiving the message(s), a score can be derived for each of the storage nodes A 112.1, B 112.2 and serve as a basis for selecting which storage node A 112.1 or B 112.2 to designate as the primary node of the HA cluster. The unselected storage node A 112.1 or B 112.2 can then be designated as the secondary node of the HA cluster.

Further, during operation, one of the storage nodes A 112.1, B 112.2 of the active-active storage system 104 can be determined or suspected to be malfunctioning, while the other storage node A 112.1 or B 112.2 continues functioning properly. As such, the functioning storage node A 112.1 or B 112.2 (the "healthy node") can execute its fencing enforcer to take the following exemplary actions or steps for initiating self-fencing of the malfunctioning storage node B 112.2 or A 112.1 (the "failing node"). In a first set of steps, the healthy node can attempt to obtain certain information from the failing node to determine its status or current state. For example, the healthy node can send, to the failing node, an IPMI command over a suitable one of the channel connections 114 to determine the power status of the failing node. If, in response to the IPMI command, the failing node's power status is determined to be powered-off ("OFF"), then there is no need to initiate self-fencing of the failing node and the healthy node may more safely take on (or continue in) the role of the primary node in the HA cluster.

In addition, if the failing node is in a kernel panic, then it can send a packet notification or post over a suitable one of the network or channel connections 114 to inform the healthy node of the kernel panic. As employed herein, the term "kernel panic" refers to actions or steps that can be taken by an operating system (OS) upon detection of an internal error from which it cannot safely recover. For example, a kernel panic can result from a hardware (HW) or software (SW) failure or SW bug in the OS. Notwithstanding such a HW or SW failure or SW bug, the OS of the failing node may still be capable of continued operation. However, because the failing node is in an unstable state, its OS will cease operation to avoid data corruption and facilitate diagnostic analysis and debug. While in the kernel panic, the failing node can execute a kernel routine to output an error message, dump an image of kernel memory to a drive for subsequent analysis and debugging, and wait to be rebooted or initiate an automatic reboot. In addition, because critical resources of the failing node are locked and no threads are executing on the failing node other than its kernel routine, there is no need to initiate self-fencing of the failing node and the healthy node may more safely take on (or continue in) the role of the primary node in the HA cluster.

In a second set of steps, it is assumed that the failing node's power status is powered-on ("ON") and the failing node is not in a kernel panic. In this case, the fencing enforcer of the healthy node can send, to the fencing enforcer of the failing node, a "self-fence" command over a suitable one of the network or channel connections 114 to initiate a self-fencing sequence at the failing node. The healthy node's fencing enforcer can then wait a specified (short) time period (e.g., on the order of hundreds of milliseconds) for an acknowledgment from the failing node's fencing enforcer, indicating that the self-fencing sequence has started. Further, while waiting for the acknowledgment from the failing node, the healthy node can periodically perform a ping, query, or liveness check and receive responses indicating that the failing node has not "hanged" or otherwise failed to perform the self-fencing sequence successfully. During the self-fencing sequence, the failing node's fencing enforcer can direct the failing node to stop accessing its critical resources, terminate any processes accessing shared resources in the HA cluster, maintain and save log and diagnostic information to a drive for subsequent analysis, and initiate an automatic reboot. Once the self-fencing sequence has been successfully performed at the failing node, the healthy node may more safely take on (or continue in) the role of the primary node in the HA cluster. It is noted that if a self-fence command is received at the healthy node after the failing node has started its self-fencing sequence, then the healthy node's fencing enforcer can ignore or otherwise refuse the self-fence command to avoid a scenario of mutual fencing at the healthy and failing nodes. It is further noted that during the self-fencing sequence, the floating IP address can be removed from an Ethernet port of the failing node (if previously designated as the primary node in the HA cluster) and established on an Ethernet port of the healthy node (if newly promoted to the role of the primary node in the HA cluster).

In a third set of steps, it is again assumed that the failing node's power status is "ON" and the failing node is not in a kernel panic. However, the healthy node, after waiting the specified (short) time period, has not received an acknowledgment of the self-fence command from the failing node. Moreover, during the specified time period, the healthy node has not received any other response(s) from the failing node over the network or channel connections 114. In this case, the healthy node's fencing enforcer can, by its own initiative, attempt to maintain and save log and diagnostic information from the failing node for subsequent analysis by sending a "log flush" command over a suitable one of the channel connections 114 to flush the failing node's log to a drive, and/or by sending an IPMI command to initiate a non-maskable interrupt (NMI) on the OS to force a kernel panic at the failing node. While in the kernel panic, critical resources of the failing node are locked, and no threads are executing on the failing node other than the kernel routine. The healthy node may then more safely take on (or continue in) the role of the primary node in the HA cluster.

In a fourth set of steps, it is assumed that the healthy node's attempt to maintain and save log and diagnostic information from the failing node was unsuccessful. In this case, the healthy node's fencing enforcer can send, to the failing node, an IPMI command over a suitable one of the channel connections 114 to "power cycle" the failing node, effectively removing power from and reestablishing power to the failing node, and to initiate an automatic reboot, after which the healthy node's fencing enforcer can again send a self-fence command to the failing node. Once the self-fencing sequence has been successfully performed at the failing node, the healthy node may more safely take on (or continue in) the role of the primary node in the HA cluster. However, if, after waiting the specified (short) time period, the healthy node has not received an acknowledgment from the failing node's fencing enforcer indicating that the self-fencing sequence has started, then the healthy node's fencing enforcer can initiate the self-fencing sequence at the healthy node. In this case, the healthy node may be incapable of determining whether it can safely take on (or continue in) the role of the primary node in the HA cluster. For example, the healthy node may be incapable of determining whether the failing node has stopped accessing its critical resources and/or terminated any processes accessing shared resources in the HA cluster, making it difficult if not impossible to determine whether it can safely perform the duties of the primary node in the HA cluster. In some cases, such incapability of the purported "healthy" node may be an indication that it is in a malfunctioning or failing state. In view of the priority of assuring that metadata and/or data remain consistent and coherent across the storage nodes in the HA cluster, the healthy node's fencing enforcer will preferably initiate the self-fencing sequence at the healthy node when the safety of it acting as the primary node in the HA cluster is in doubt. During the self-fencing sequence, the healthy node's fencing enforcer can direct the healthy node to stop accessing its critical resources, terminate any processes accessing shared resources in the HA cluster, maintain and save log and diagnostic information to a drive for subsequent analysis, as well as initiate an automatic reboot.

Figure 3A:
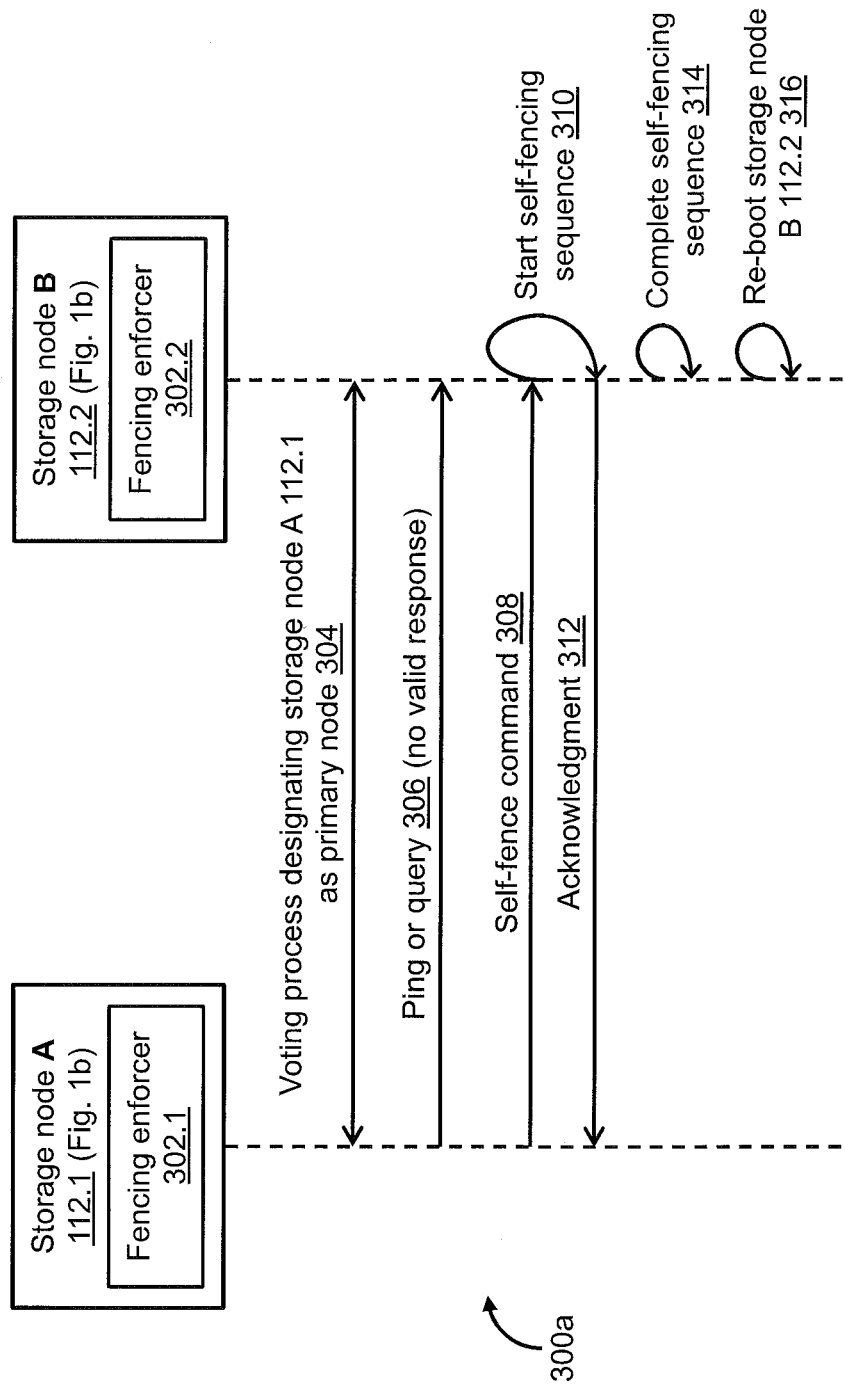
FIG. 3a is a ladder diagram illustrating a first exemplary set of actions or steps for fencing a malfunctioning or failing storage node included in the active-active storage system of FIG. 1b.
Figure 3B:
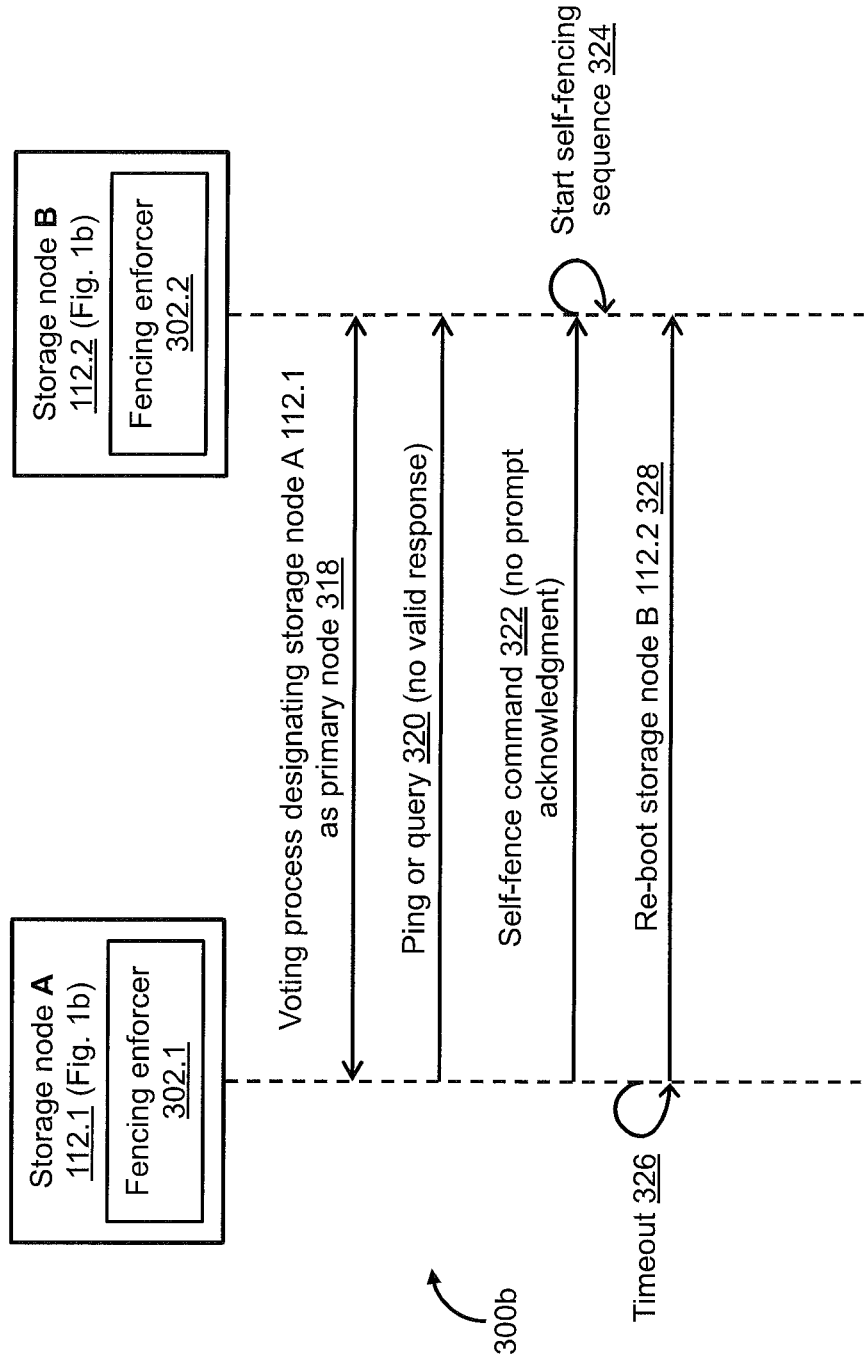
FIG. 3b is a ladder diagram illustrating a second exemplary set of actions or steps for fencing a malfunctioning or failing storage node included in the active-active storage system of FIG. 1b.
Figure 3C:
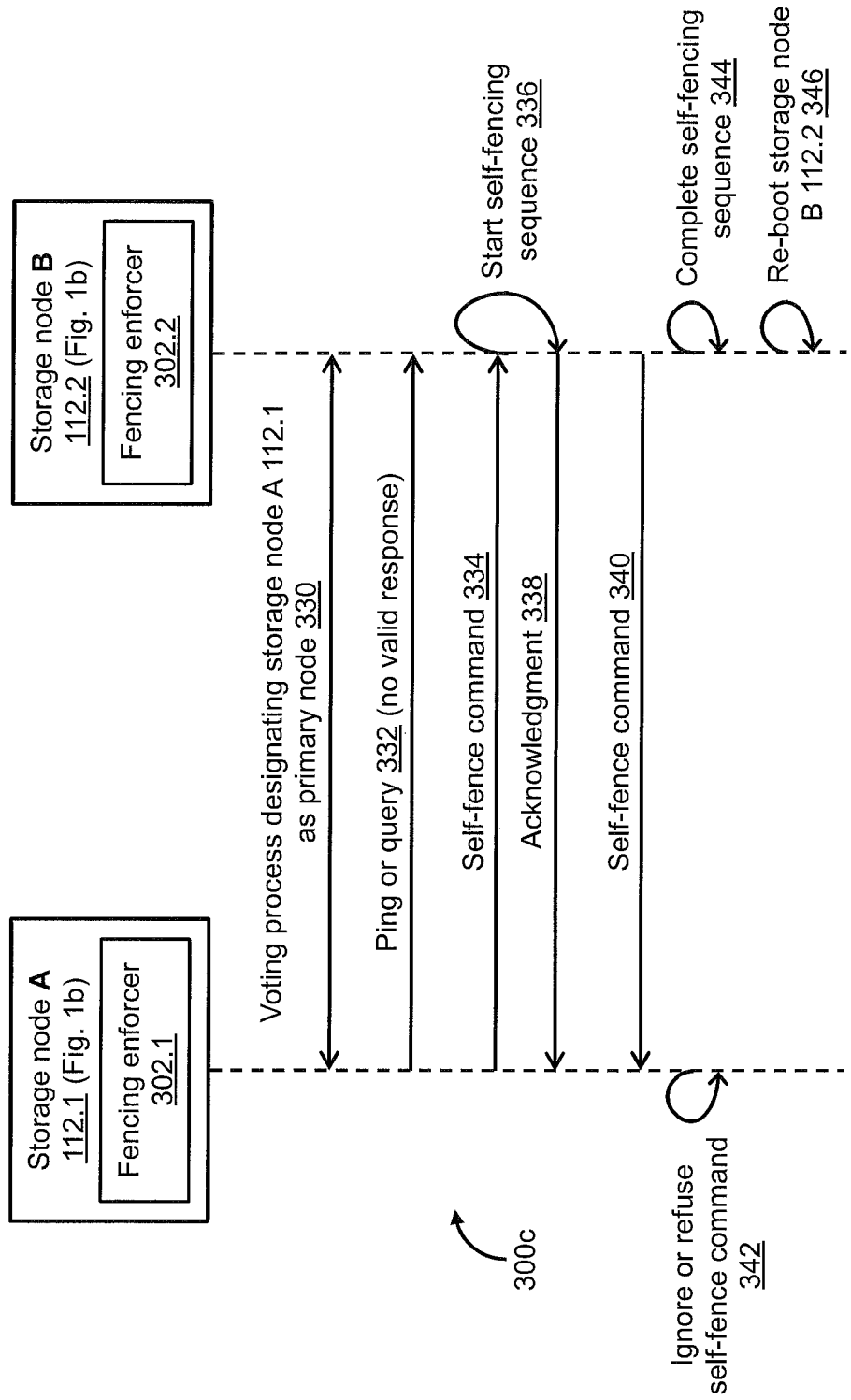
FIG. 3c is a ladder diagram illustrating a third exemplary set of actions or steps for fencing a malfunctioning or failing storage node included in the active-active storage system of FIG. 1b.

The disclosed techniques for providing an enhanced fencing scheme for cluster systems without inherent hardware (HW) fencing will be further understood with reference to the following illustrative examples and FIGS. 3a-3c. FIGS. 3a-3c depict ladder diagrams 300a-300c, respectively, which illustrate exemplary sets of actions or steps that can be performed to fence a malfunctioning or failing storage node A 112.1 or B 112.2 in the HA cluster of the active-active storage system 104 (see FIG. 1b). As shown in FIGS. 3a-3c, each of the ladder diagrams 300a-300c involves the storage node A 112.1 and the storage node B 112.2, which are configured to execute a fencing enforcer 302.1 and a fencing enforcer 302.2, respectively, to enforce the respective exemplary sets of actions or steps.

With regard to a first exemplary set of steps illustrated by the ladder diagram 300a of FIG. 3a, it is assumed that both of the fencing enforcers 302.1, 302.2 of the storage nodes A 112.1, B 112.2, respectively, are operational and can communicate over a variety of means or mechanisms, including drives and network or channel connections. As shown in FIG. 3a, the storage nodes A 112.1, B 112.2 can engage in a voting process (see reference numeral 304) that culminates in designating the storage node A 112.1 as the primary node of the HA cluster and designating the storage node B 112.2 as the secondary node of the HA cluster. It is noted that based on the results of the voting process, the storage node B 112.2 may alternatively be designated as the primary node and the storage node A 112.1 may alternatively be designated as the secondary node. As further shown in FIG. 3a, the storage node A 112.1 (the primary node) sends a ping or query (see reference numeral 306) to the storage node B 112.2 (the secondary node). Having received no valid response to the ping or query, the primary node determines that the secondary node is malfunctioning or failing and directs its fencing enforcer 302.1 to send a self-fence command (see reference numeral 308) to the fencing enforcer 302.2 of the secondary node. In response to the self-fence command, the fencing enforcer 302.2 starts a self-fencing sequence (see reference numeral 310) and sends an acknowledgment (see reference numeral 312) of the self-fence command to the primary node. The fencing enforcer 302.2 then completes the self-fence sequence (see reference numeral 314) and performs an automatic re-boot of the secondary node (see reference numeral 316).

With regard to a second exemplary set of steps illustrated by the ladder diagram 300b of FIG. 3b, it is again assumed that both of the fencing enforcers 302.1, 302.2 of the storage nodes A 112.1, B 112.2, respectively, are operational and can communicate over a variety of means or mechanisms, including drives and network connections. However, one of the storage nodes A 112.1, B 112.2 fails to complete a self-fencing sequence within a specified (short) time period (e.g., on the order of hundreds of milliseconds). As shown in FIG. 3b, the storage nodes A 112.1, B 112.2 can engage in a voting process (see reference numeral 318) that culminates in designating the storage node A 112.1 as the primary node of the HA cluster and designating the storage node B 112.2 as the secondary node of the HA cluster. As noted previously herein, based on the results of the voting process, the storage node B 112.2 may alternatively be designated as the primary node and the storage node A 112.1 may alternatively be designated as the secondary node. As further shown in FIG. 3b, the storage node A 112.1 (the primary node) sends a ping or query (see reference numeral 320) to the storage node B 112.2 (the secondary node). Having received no valid response to the ping or query, the primary node determines that the secondary node is malfunctioning or failing and directs its fencing enforcer 302.1 to send a self-fence command (see reference numeral 322) to the fencing enforcer 302.2 of the secondary node. In response to the self-fence command, the fencing enforcer 302.2 starts a self-fencing sequence (see reference numeral 324) but fails to send an acknowledgment of the self-fence command to the primary node within the specified time period, resulting in a timeout (see reference numeral 326) at the primary node. Having failed to receive the acknowledgment of the self-fence command from the secondary node, the primary node re-boots (see reference numeral 328) the secondary node.

With regard to a third exemplary set of steps illustrated by the ladder diagram 300c of FIG. 3c, it is again assumed that both of the fencing enforcers 302.1, 302.2 of the storage nodes A 112.1, B 112.2, respectively, are operational and can communicate over a variety of means or mechanisms, including drives and network connections. However, each of the storage nodes A 112.1, B 112.2 receives a self-fence command, potentially resulting in a scenario of mutual fencing at the respective storage nodes A 112.1, B 112.2. As shown in FIG. 3c, the storage nodes A 112.1, B 112.2 can engage in a voting process (see reference numeral 330) that culminates in designating the storage node A 112.1 as the primary node of the HA cluster and designating the storage node B 112.2 as the secondary node of the HA cluster. As noted previously herein, based on the results of the voting process, the storage node B 112.2 may alternatively be designated as the primary node and the storage node A 112.1 may alternatively be designated as the secondary node. As further shown in FIG. 3c, the storage node A 112.1 (the primary node) sends a ping or query (see reference numeral 332) to the storage node B 112.2 (the secondary node). Having received no valid response to the ping or query, the primary node determines that the secondary node is malfunctioning or failing and directs its fencing enforcer 302.1 to send a self-fence command (see reference numeral 334) to the fencing enforcer 302.2 of the secondary node. In response to the self-fence command, the fencing enforcer 302.2 starts a self-fencing sequence (see reference numeral 336) and sends an acknowledgment (see reference numeral 338) of the self-fence command to the primary node. In addition, the fencing enforcer 302.2 sends, by its own initiative, a self-fence command (see reference numeral 340) to the primary node. However, because the storage node A 112.1 recognizes its designation as the primary node of the HA cluster, the fencing enforcer 302.1 ignores or refuses the self-fence command (see reference numeral 342), thereby avoiding the potential scenario of mutual fencing. The fencing enforcer 302.2 then completes the self-fence sequence (see reference numeral 344) and performs an automatic re-boot of the secondary node (see reference numeral 346).

Figure 4:
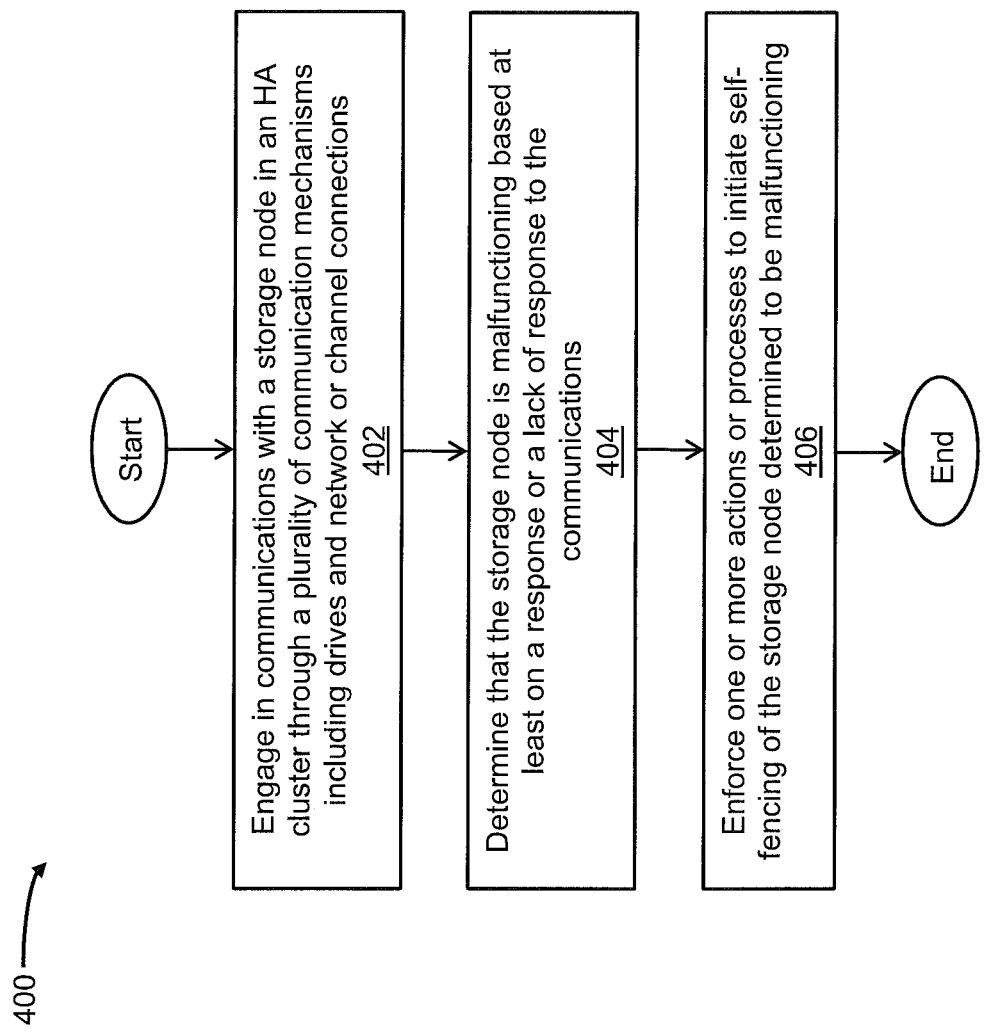
FIG. 4 is a flow diagram of an exemplary method of providing an enhanced fencing scheme for cluster systems without inherent HW fencing.

An exemplary method 400 of providing an enhanced fencing scheme for cluster systems without inherent HW fencing is described below with reference to FIG. 4. As depicted in block 402, communications are engaged in with a storage node in an HA cluster through a plurality of communication mechanisms including drives and network or channel connections. As depicted in block 404, it is determined that the storage node is malfunctioning based at least on a response or a lack of response to the communications. As depicted in block 406, one or more actions or processes are enforced to initiate self-fencing of the storage node determined to be malfunctioning.

Figure 5:
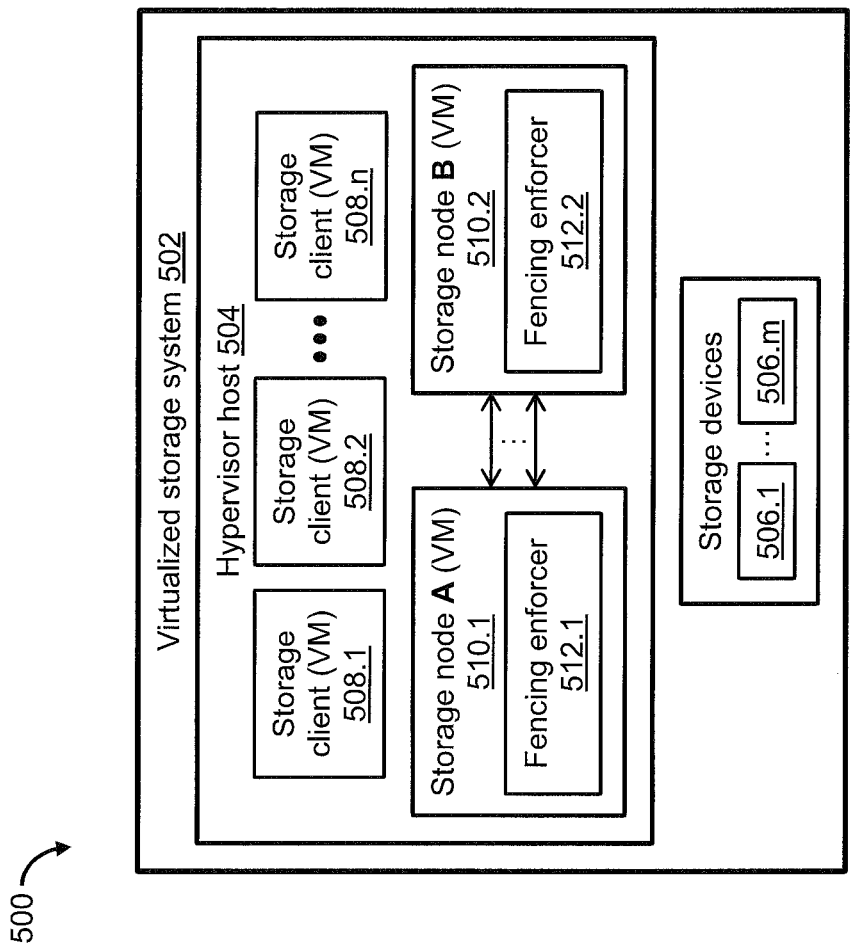
FIG. 5 is a block diagram of an exemplary alternative storage environment, in which techniques can be practiced for providing an enhanced fencing scheme within a virtualized storage system.

Having described the above illustrative embodiments, other alternative embodiments or variations may be made and/or practiced. For example, FIG. 5 depicts an illustrative embodiment of an alternative storage environment 500, in which techniques can be practiced for providing an enhanced fencing scheme within a virtualized storage system 502. As shown in FIG. 5, the virtualized storage system 502 can include a plurality of storage clients 508.1, 508.2, . . . , 508.n, each of which can be embodied as a virtual machine (VM). The virtualized storage system 502 can further include dual storage nodes, namely, a storage node A (VM) 510.1 and a storage node B (VM) 510.2, each of which can also be embodied as a VM, as well as a plurality of storage devices 506.1, . . . , 506.m. Like the storage nodes A 112.1, B 112.2 of the active-active storage system 104 (see FIG. 1b), the storage nodes A (VM) 510.1, B (VM) 510.2 of the virtualized storage system 502 can be arranged in an active-active system configuration of a highly available cluster. As further shown in FIG. 5, the storage node A (VM) 510.1 and the storage node B (VM) 510.2 can be configured to execute a fencing enforcer 512.1 and a fencing enforcer 512.2, respectively, and to communicate with one another over multiple communication paths implemented through a variety of means or mechanisms, including drives and network connections. The plurality of storage clients (VMs) 508.1, 508.2, . . . , 508.n, the storage node A (VM) 510.1, and the storage node B (VM) 510.2 can each be configured to execute on at least one hypervisor host 504. As such, the storage nodes A (VM) 510.1, B (VM) 510.2 can share memory and/or processing resources with the storage clients (VMs) 508.1, 508.2, . . . , 508.n for servicing both storage and client workloads.

As described herein, within the active-active storage system 104 (see FIG. 1b), a healthy node's fencing enforcer can send, to a failing node, an IPMI command over a suitable channel connection to power cycle the failing node and initiate an automatic reboot. However, within the virtualized storage system 502 (see FIG. 5), the actions of power-cycling and initiating a reboot of a failing node can adversely affect the shared hardware memory and/or processing resources used to service at least some of the client workloads. To address this situation within the virtualized storage system 502, a healthy virtual machine (VM) node (e.g., the storage node A (VM) 510.1 or the storage node B (VM) 510.2) can reboot, restart, or reset a failing VM node (e.g., the storage node B (VM) 510.2 or the storage node A (VM) 510.1) by obtaining, from the hypervisor host 504, an identifier (ID) of the virtual machine that embodies processes of the failing VM node, and issuing a non-maskable interrupt (NMI) on the hypervisor host 504 to force a kernel panic at the VM having that ID (i.e., the failing VM node). Further, the failing VM node can send a notification to inform the healthy VM node of the kernel panic, execute a kernel routine to output an error message, dump an image of kernel memory to a drive for subsequent analysis and debugging, and wait to be restarted or initiate an automatic restart. If, however, the healthy VM node does not receive the notification of the kernel panic after waiting a specified (short) time period (e.g., on the order of hundreds of milliseconds), then the healthy VM node can send a request to the hypervisor host 504 to terminate and restart the processes of the failing VM node. In this way, the processes of the failing VM node can be terminated and restarted while keeping the hypervisor host 504 running and serving client workloads, without adversely affecting the shared hardware resources used to service the client workloads. It is noted that if attempts to terminate and restart the processes of the failing VM node prove unsuccessful, then more drastic measures may be taken without regard to the shared hardware resources to assure that metadata and/or data remain consistent and coherent across the storage nodes A (VM) 510.1, B (VM) 510.2 of the virtualized storage system 502.

Several definitions of terms are provided below for the purpose of aiding the understanding of the foregoing description, as well as the claims set forth herein.

As employed herein, the term "storage system" is intended to be broadly construed to encompass, for example, private or public cloud computing systems for storing data, as well as systems for storing data comprising virtual infrastructure and those not comprising virtual infrastructure.

As employed herein, the terms "client," "host," and "user" refer, interchangeably, to any person, system, or other entity that uses a storage system to read/write data.

As employed herein, the term "storage device" may refer to a storage array including multiple storage devices. Such a storage device may refer to any non-volatile memory (NVM) device, including hard disk drives (HDDs), solid state drives (SSDs), flash devices (e.g., NAND flash devices, NOR flash devices), and/or similar devices that may be accessed locally and/or remotely (e.g., via a storage attached network (SAN)). A storage array (drive array, disk array) may refer to a storage system used for block-based, file-based, or object storage. Storage arrays can include, for example, dedicated storage hardware containing HDDs, SSDs, and/or all-flash drives. A storage entity may be a filesystem, an object storage, a virtualized device, a logical unit (LU), a logical unit number (LUN), a logical volume (LV), a logical device, a physical device, and/or a storage medium. An LU may be a logical entity provided by a storage system for accessing data from the storage system and may be used interchangeably with a logical volume. An LU or LUN may be used interchangeably with each other. A LUN may be a logical unit number for identifying an LU and may also refer to one or more virtual disks or virtual LUNs, which may correspond to one or more virtual machines. A physical storage unit may be a physical entity such as a drive or disk or an array of drives or disks for storing data in storage locations that can be accessed by addresses. A physical storage unit may be used interchangeably with a physical volume.

As employed herein, the term "storage medium" may refer to one or more storage media such as a hard drive, a combination of hard drives, flash storage, a combination of flash storage, a combination of hard drives, flash storage, and other storage devices, and/or any other suitable types or combinations of computer readable storage media. A storage medium may also refer to both physical and logical storage media, include multiple levels of virtual-to-physical mappings, and include an image or disk image. A storage medium may be computer-readable and may be referred to as a computer-readable program medium.

As employed herein, the term "IO request" or "IO" may be used to refer to an input or output request such as a data read request or data write request.

As employed herein, the terms, "such as," "for example," "e.g.," "exemplary," and variants thereof describe non-limiting embodiments and mean "serving as an example, instance, or illustration." Any embodiments described herein using such phrases and/or variants are not necessarily to be construed as preferred or more advantageous over other embodiments, and/or to exclude the incorporation of features from other embodiments. In addition, the term "optionally" is employed herein to mean that a feature or process, etc., is provided in certain embodiments and not provided in other certain embodiments. Any particular embodiment of the present disclosure may include a plurality of "optional" features unless such features conflict with one another.

While various embodiments of the present disclosure have been particularly shown and described, it will be understood by those skilled in the art that various changes in form and details may be made therein without departing from the scope of the present disclosure, as defined by the appended claims.

What is claimed is:

1. A cluster system, comprising:
a first storage node and a second storage node arranged in an active-active storage system configuration,
wherein the first storage node is configured as a first virtual machine (VM) executing on at least one hypervisor host, and
wherein the second storage node is configured as a second VM executing on the at least one hypervisor host; and
a plurality of storage drives communicably coupled to the first VM and the second VM,
wherein the first VM is configured to:
engage in communications with the second VM through a plurality of communication mechanisms including the plurality of storage drives and multiple network or channel connections;
determine that the second VM is malfunctioning based at least on a response or a lack of response to the communications;
enforce one or more actions or processes to initiate self-fencing of the second VM determined to be malfunctioning;
obtain, from the at least one hypervisor host, an identifier (ID) of the second VM determined to be malfunctioning; and
force a kernel panic at the second VM having the obtained ID by issuing a non-maskable interrupt (NMI) on the at least one hypervisor host.

2. The cluster system of claim 1 wherein the first VM is further configured to:
fail to receive a notification of the kernel panic; and
having failed to receive the notification of the kernel panic, send a request to the at least one hypervisor host to terminate and restart the second VM having the obtained ID.

3. The cluster system of claim 1 wherein the second VM is configured to send a notification to inform the first VM of the kernel panic.

4. The cluster system of claim 3 wherein the second VM is further configured to execute a kernel routine to output an error message.

5. The cluster system of claim 4 wherein the second VM is further configured to dump an image of kernel memory to a respective storage drive from among the plurality of storage drives for subsequent analysis and debugging.

6. The cluster system of claim 5 wherein the second VM is further configured either to wait to be restarted or to initiate an automatic restart.

7. A method, comprising:
engaging in communications by a first storage node with a second storage node through a plurality of communication mechanisms including a plurality of storage drives and multiple network or channel connections, the first storage node and the second storage node being arranged in an active-active storage system configuration, the first storage node being configured as a first virtual machine (VM) executing on at least one hypervisor host, the second storage node being configured as a second VM executing on the at least one hypervisor host, the plurality of storage drives being communicably coupled to the first VM and the second VM;
determining, by the first VM, that the second VM is malfunctioning based at least on a response or a lack of response to the communications;
enforcing, by the first VM, one or more actions or processes to initiate self-fencing of the second VM determined to be malfunctioning;
obtaining, by the first VM from the at least one hypervisor host, an identifier (ID) of the second VM determined to be malfunctioning; and
forcing, by the first VM, a kernel panic at the second VM having the obtained ID by issuing a non-maskable interrupt (NMI) on the at least one hypervisor host.

8. The method of claim 7 further comprising:
failing to receive, at the first VM, a notification of the kernel panic; and
having failed to receive the notification of the kernel panic, sending, by the first VM, a request to the at least one hypervisor host to terminate and restart the second VM having the obtained ID.

9. The method of claim 7 further comprising:
sending, by the second VM, a notification to inform the first VM of the kernel panic.

10. The method of claim 9 further comprising:
executing, by the second VM, a kernel routine to output an error message.

11. The method of claim 10 further comprising:
dumping, by the second VM, an image of kernel memory to a respective storage drive from among the plurality of storage drives for subsequent analysis and debugging.

12. The method of claim 11 further comprising:
performing, by the second VM, one of waiting to be restarted and initiating an automatic restart.

13. A computer program product including a set of non-transitory, computer-readable media having program instructions that, when executed by processing circuitry, cause the processing circuitry to perform a method comprising:
engaging in communications by a first storage node with a second storage node through a plurality of communication mechanisms including a plurality of storage drives and multiple network or channel connections, the first storage node and the second storage node being arranged in an active-active storage system configuration, the first storage node being configured as a first virtual machine (VM) executing on at least one hypervisor host, the second storage node being configured as a second VM executing on the at least one hypervisor host, the plurality of storage drives being communicably coupled to the first VM and the second VM;

determining, by the first VM, that the second VM is malfunctioning based at least on a response or a lack of response to the communications;

enforcing, by the first VM, one or more actions or processes to initiate self-fencing of the second VM determined to be malfunctioning;

obtaining, by the first VM from the at least one hypervisor host, an identifier (ID) of the second VM determined to be malfunctioning; and forcing, by the first VM, a kernel panic at the second VM having the obtained ID by issuing a non-maskable interrupt (NMI) on the at least one hypervisor host.

14. The computer program product of claim 13 wherein the method further comprises:

failing to receive, at the first VM, a notification of the kernel panic; and having failed to receive the notification of the kernel panic, sending, by the first VM, a request to the at least one hypervisor host to terminate and restart the second VM having the obtained ID.

15. The computer program product of claim 13 wherein the method further comprises:

sending, by the second VM, a notification to inform the first VM of the kernel panic.

16. The computer program product of claim 15 wherein the method further comprises:

executing, by the second VM, a kernel routine to output an error message.

17. The computer program product of claim 16 wherein the method further comprises:

dumping, by the second VM, an image of kernel memory to a respective storage drive from among the plurality of storage drives for subsequent analysis and debugging.

18. The computer program product of claim 17 wherein the method further comprises:

performing, by the second VM, one of waiting to be restarted and initiating an automatic restart.

* * * * *